(12) United States Patent
Huang

(10) Patent No.: US 8,179,488 B2
(45) Date of Patent: May 15, 2012

(54) LIQUID CRYSTAL DISPLAY PANEL

(75) Inventor: Chin-Hai Huang, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 449 days.

(21) Appl. No.: 12/611,093

(22) Filed: Nov. 2, 2009

(65) Prior Publication Data

US 2010/0328562 A1 Dec. 30, 2010

(30) Foreign Application Priority Data

Jun. 25, 2009 (TW) .............................. 98121343 A

(51) Int. Cl.
*G02F 1/1368* (2006.01)
*G02F 1/1343* (2006.01)
(52) U.S. Cl. ................................ 349/38; 349/39; 349/43
(58) Field of Classification Search .................... 349/38, 349/39, 42, 43, 139; 257/59, 72; 345/92
See application file for complete search history.

(56) References Cited

U.S. PATENT DOCUMENTS

| | | | | |
|---|---|---|---|---|
| 6,028,650 A * | 2/2000 | Kuroha et al. | ................... | 349/38 |
| 6,760,081 B2 * | 7/2004 | Takagi | ............................ | 349/38 |
| 6,897,908 B2 | 5/2005 | Lee et al. | | |
| 6,909,415 B2 * | 6/2005 | Kumagawa et al. | ............ | 345/92 |
| 6,982,775 B2 * | 1/2006 | Lee et al. | ....................... | 349/139 |
| 7,746,416 B2 * | 6/2010 | Wu | ................................. | 349/38 |
| 2009/0009674 A1 * | 1/2009 | Chung et al. | .................... | 349/39 |

* cited by examiner

*Primary Examiner* — Dung Nguyen
*Assistant Examiner* — Tai Duong
(74) *Attorney, Agent, or Firm* — Winston Hsu; Scott Margo

(57) ABSTRACT

A liquid crystal display panel includes a plurality of scan lines and a plurality of pixels. Each scan line has a signal-input end, and each pixel includes a gate electrode, a drain electrode, an extending electrode and a coupling capacitor. The extending electrode is an extending part of the drain electrode, and does not overlap the gate electrode. Each coupling capacitor is coupled between each extending electrode and the corresponding scan line. In each scan line, capacitances of the coupling capacitors between the extending electrodes and the corresponding scan line increase as distances between the extending electrodes and the corresponding signal-input end increase.

11 Claims, 9 Drawing Sheets

LIQUID CRYSTAL DISPLAY PANEL

BACKGROUND OF THE INVENTION

1. Field of the Invention

The present invention relates to a liquid crystal display panel, and more particularly, to a liquid crystal display panel being able to display frames without flicker.

2. Description of the Prior Art

Thin-film-transistor (TFT) liquid crystal display (LCD) panels utilize TFTs arranged in matrix together with other suitable electronic devices to drive liquid crystal pixels in the TFT LCD panels so as to generate colorful pictures. The TFT-LCD panels have been widely applied to portable information products, such as notebook and PDA, etc., due to having characteristics, such as thin thickness, low power consumption and no radiation pollution, and the TFT-LCD panels even have been gradually replaced the cathode ray tube (CRT) monitors of traditional desktop computers.

Refer to FIG. 1 and FIG. 2. FIG. 1 is a schematic diagram illustrating an LCD panel according to the prior art, and FIG. 2 is a schematic diagram illustrating an equivalent circuit of a pixel in the LCD panel according to the prior art. As shown in FIG. 1, the LCD panel 10 includes a first substrate 12, a second substrate 14, a liquid crystal layer (not shown in figure), a plurality of scan lines 16, a plurality of data lines 18, and a plurality of pixels 20. The scan lines 16 and the data lines 18 are disposed on the first substrate 12, and any two of the scan lines 16 and any two of the data lines 18 define a pixel 20. In addition, the LCD panel 10 further includes a plurality of gate driving ICs 22 and a plurality of data driving ICs 24, disposed on the first substrate 12. A signal-input end 26 of each scan line 16 is electrically connected to the corresponding gate driving IC 22, respectively, and the data lines 18 are electrically connected to the data driving ICs 24. As shown in FIG. 2, each pixel 20 includes a TFT 28, a coupling capacitor Cgd, a liquid crystal capacitor Clc and a storage capacitor Cs. The coupling capacitor Cgd is a parasitical capacitor in the TFT 28 formed by a gate electrode 30 and a drain electrode 32 of the TFT 28 coupled to each other. The liquid crystal capacitor Clc is composed of a pixel electrode 33, a common electrode 34 disposed on the second substrate 14, and the liquid crystal layer in each pixel 20. The storage capacitor Cs is generated by the pixel electrode 33 and a common line 36 disposed on the first substrate 12 coupled to each other. Furthermore, a source electrode 38 of the TFT 28 is electrically connected to the corresponding data line 18, and the gate electrode 32 is electrically connected to the corresponding scan line 16. The drain electrode 32 is electrically connected to the corresponding pixel electrode 33.

When the LCD panel 10 displays, the gate driving ICs 22 transfer gate signals to each scan line 16 in turn, respectively, and then, each TFT 28 is turned on through the corresponding scan line 16. Since each TFT 28 is received the gate signal, pixel signals are respectively transferred to the source electrodes 38 of the TFTs 28 from each data driving IC 24 through each data line 18, and each pixel signal is stored at each drain electrode 32 and each pixel electrode 33 in each pixel. Thereafter, the gate signals are closed, and the pixel signals remain to stay at the pixel electrode 33, so that the required frame can be displayed. In the displaying process, the voltage of the gate electrode 30 is dropped by a voltage drop, which is generated by the change from transferring the gate signal to stopping transferring the gate signal, and each gate electrode 30 is coupled to the corresponding drain electrode 32 through the coupling capacitor between the gate electrode 30 and the drain electrode 32, so that the voltage of the pixel electrode 33 will also be affected by the voltage drop of the gate electrode 30 so as to be dropped while stopping transferring the gate signal. The voltage drop of the pixel electrode 33 is called feed-through voltage, and can be calculated by a formula $\Delta Vp=[(Cgd)/(Clc+Cs+Cgd)]\times\Delta Vg$, wherein $\Delta Vp$ is a voltage drop of the pixel electrode 33, and $\Delta Vg$ is a voltage drop of the gate electrode 30.

Furthermore, each scan line can be regarded as a plurality of resistors in series, and the coupling capacitor, the liquid crystal capacitor and the storage capacitor will be combined with the resistors so as to generate the RC effect, so that the gate signal is affected by the RC effect during being transferred from the signal-input end to the terminal end. The shape of the signal wave is changed from square to rounded shape so as to have a problem of insufficient voltage being charged to the pixel electrode closer to the terminal end of the scan line. In addition, the voltage drop $\Delta Vg$ of the gate electrode is affected by the RC effect, so that the pixels in a same scan line also have different voltage drops according to the formula of feed-through voltage. Therefore, error pixel signals are easily detected, which result in the displaying frames with insufficient brightness and flicker.

SUMMARY OF THE INVENTION

It is therefore an objective of the present invention to provide a liquid crystal panel to solve the problem of the displaying frames with insufficient brightness and flicker.

According to the present invention, a liquid crystal display (LCD) panel is disclosed, which comprises a substrate, a plurality of scan lines, a plurality of data lines and a plurality of pixels. The scan lines, the data lines and the pixels are disposed on the substrate, and each scan line having a signal-input end. Each pixel is defined by any two of the adjacent scan lines and any two of the data lines, and each pixel comprises a gate electrode, a gate insulating layer, a semiconductor layer, a drain electrode, a source electrode, an extending electrode, a pixel electrode and a first coupling capacitor. The gate electrode is disposed on the substrate and electrically connected to the corresponding scan line. The gate insulating layer is disposed on the gate electrode and the substrate, and the semiconductor layer is disposed on the gate insulating layer. The drain electrode and the source electrode are disposed on the semiconductor layer and the gate insulating layer, and the source electrode is electrically connected to the corresponding data line. The extending electrode disposed on the substrate, and the extending electrode is an extending part of the drain electrode. The extending electrode is electrically connected to the drain electrode and not overlapping with the gate electrode. The pixel electrode is disposed on the substrate and electrically connected to the drain electrode. The first coupling capacitor is coupled between the extending electrode and the corresponding scan line. In each scan line, capacitances of the first coupling capacitors between the extending electrodes and the corresponding scan line increase as distances between the extending electrodes and the corresponding signal-input end increase.

The present invention extends each drain electrode of each pixel to form each extending electrode, and utilizes each extending electrode to be coupled to the corresponding scan line so as to generate a coupling capacitor in each pixel. Furthermore, the capacitances of the coupling capacitors increase as the distances between the extending electrodes and the corresponding signal-input end increase so as to solve the problem of the displaying frames with insufficient brightness and flicker.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
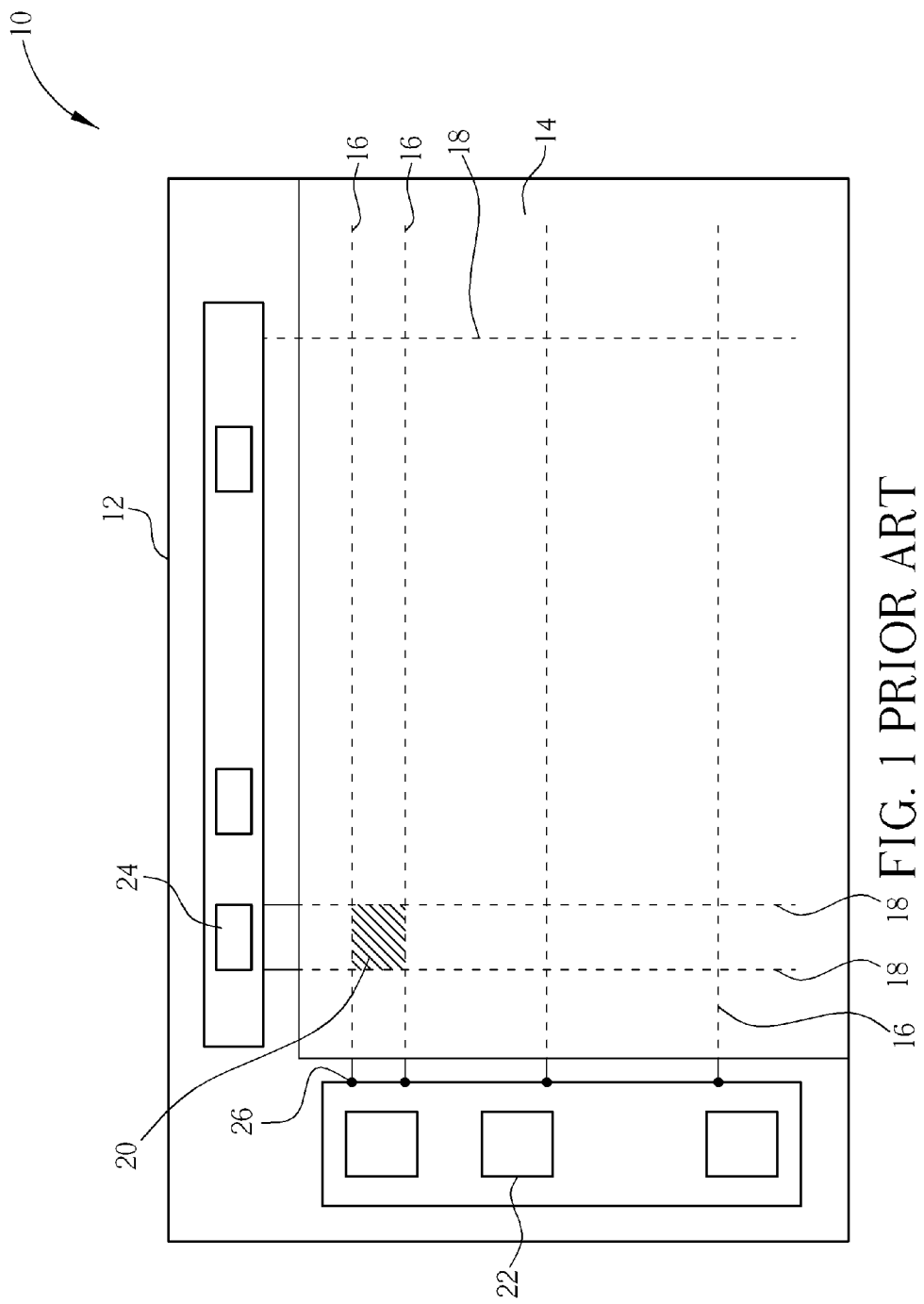
FIG. 1 is a schematic diagram illustrating an LCD panel according to the prior art.
Figure 2:
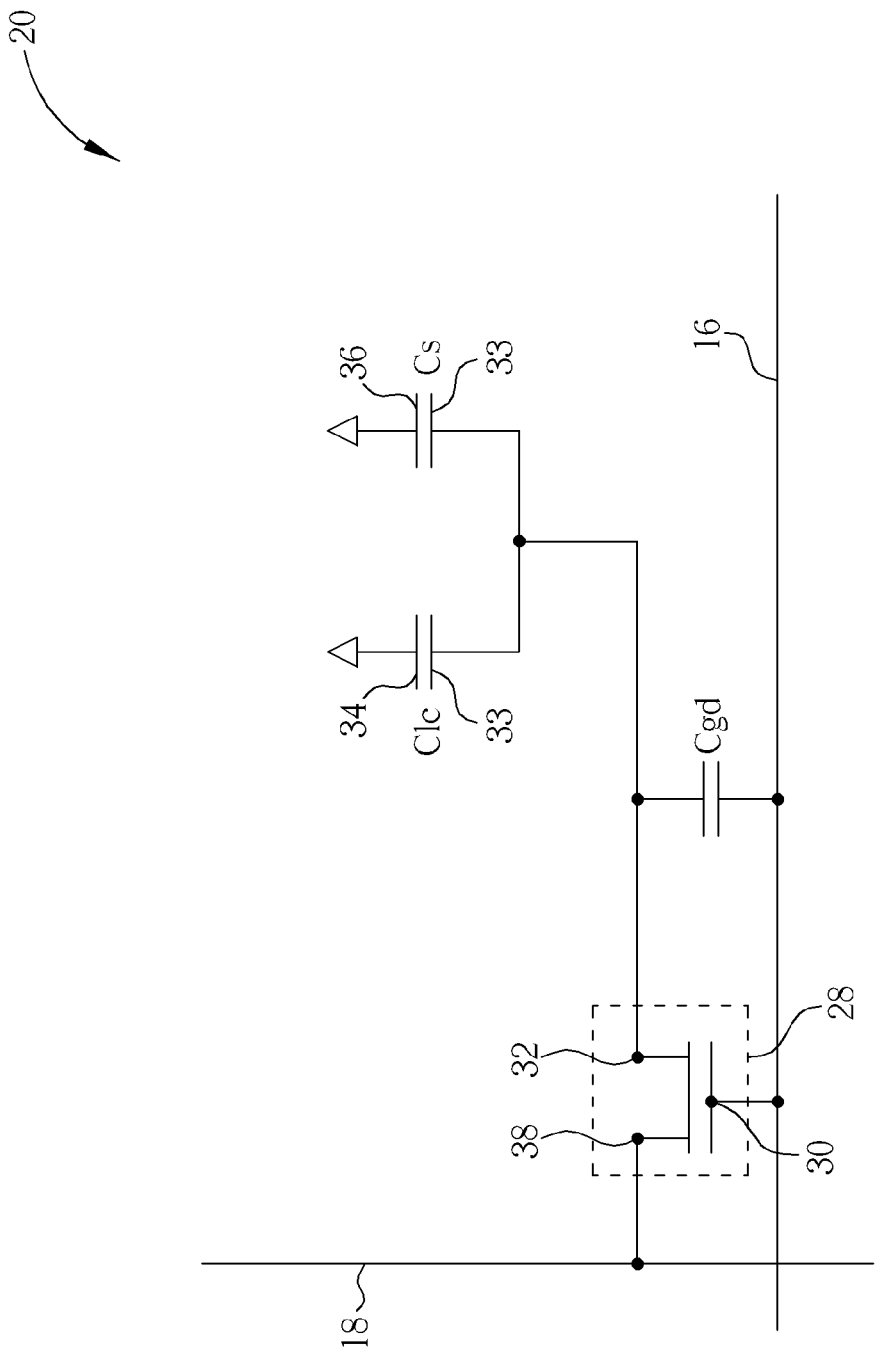
FIG. 2 is a schematic diagram illustrating an equivalent circuit of a pixel in the LCD panel according to the prior art.
Figure 3:
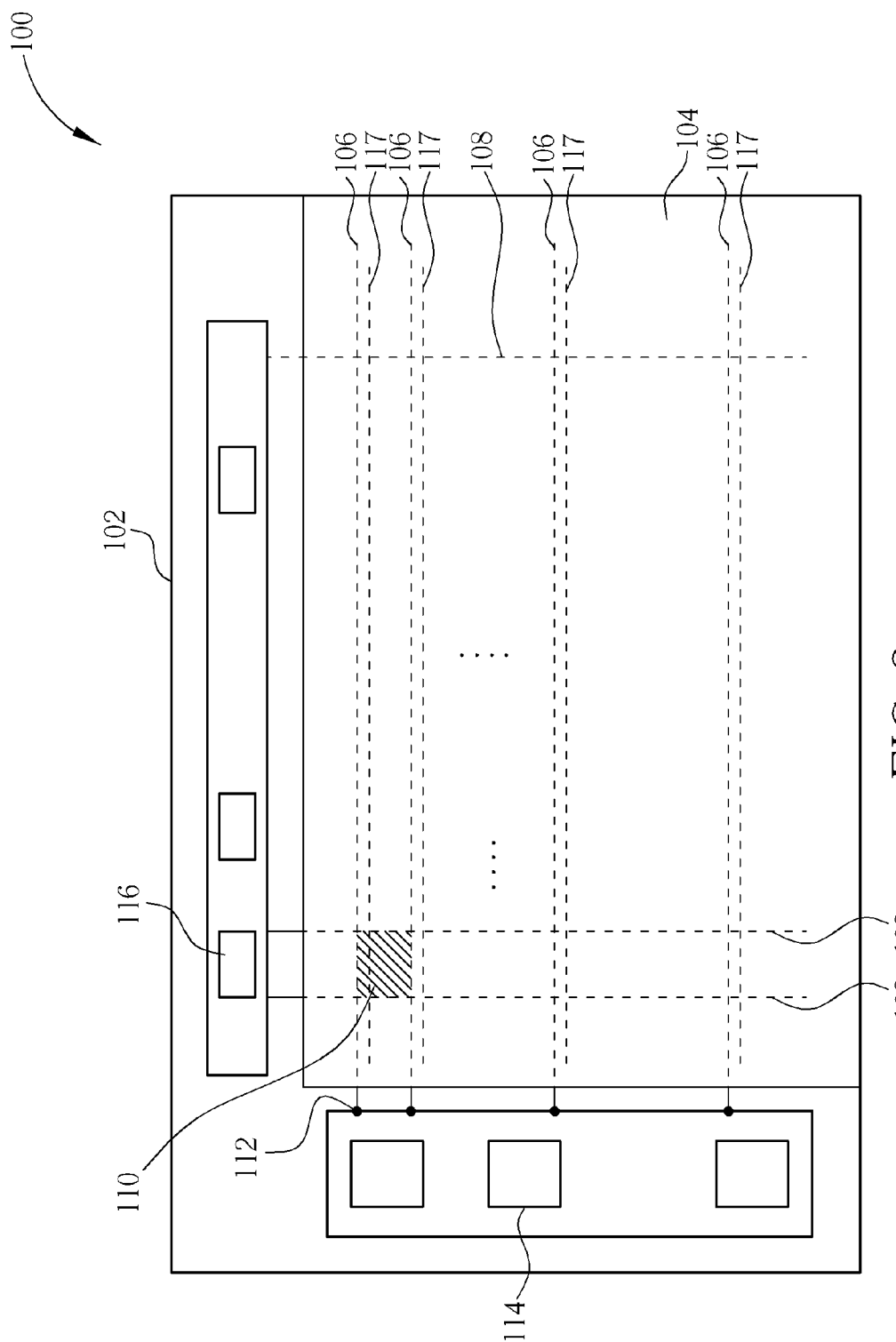
FIG. 3 is a schematic diagram illustrating a top view of a liquid crystal display (LCD) panel according to the present invention.

Refer to FIG. 3, which is a schematic diagram illustrating a top view of a liquid crystal display (LCD) panel according to the present invention. As shown in FIG. 3, the LCD panel 100 includes a first substrate 102, a second substrate 104, a liquid crystal layer (not shown in figure), a plurality of scan lines 106, a plurality of data lines 108 and a plurality of pixels 110. The second substrate 104 is a color filter substrate, and disposed on the first substrate 102 and parallel to the first substrate 102. The second substrate 104 has a common electrode (not shown in figure) disposed on a side of the second substrate 104 facing the first substrate 102. The liquid crystal layer is disposed between the first substrate 102 and the second substrate 104. The scan lines 106, the data lines 108 and the pixels 110 are disposed on the first substrate 102, and each pixel 110 is defined by any two of the scan lines 106 and any two of the data lines 108. Each scan line 106 has a signal-input end 112. In addition, the LCD panel 100 further includes a plurality of gate driving ICs 114 and a plurality of data driving ICs 116, disposed on the first substrate 102, and the gate driving ICs 114 are electrically connected to the corresponding signal-input ends 112 of the scan lines 106 so as to transfer gate signals to the corresponding scan lines 106. The data driving ICs 116 are electrically connected to the data lines 108 so as to transfer pixel signals to the data lines 108. Furthermore, the LCD panel 100 of this embodiment takes the type of a storage capacitor on a common line (Cs on common) as an example, and the present invention is not limited to this type. In addition, The LCD panel 100 further includes a plurality of common lines 117 disposed on the first substrate 102.

Figure 4:
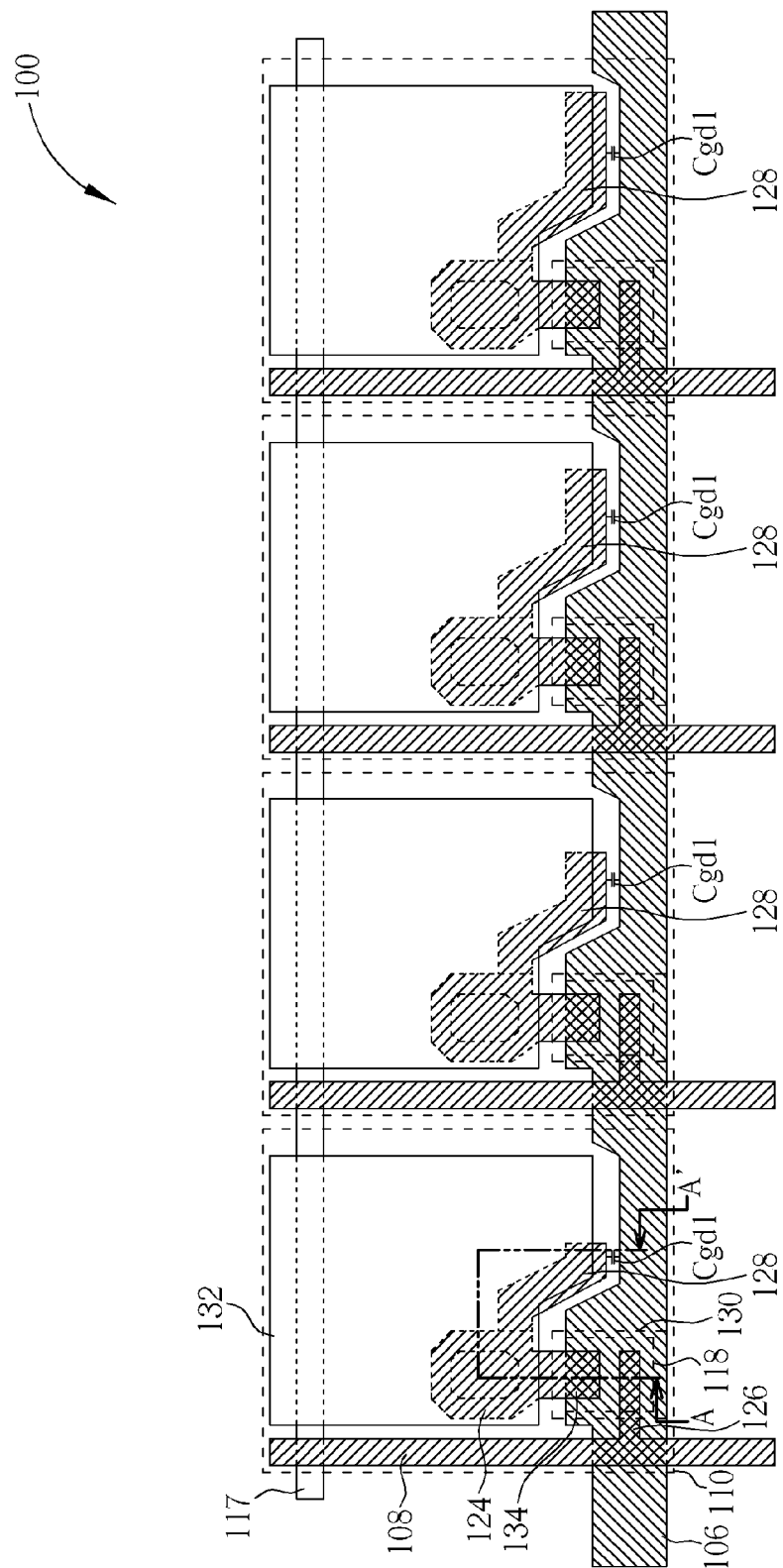
FIG. 4 is a schematic diagram illustrating a top view of the pixel in the same scan line of the LCD panel according to a first embodiment of the present invention.
Figure 5:
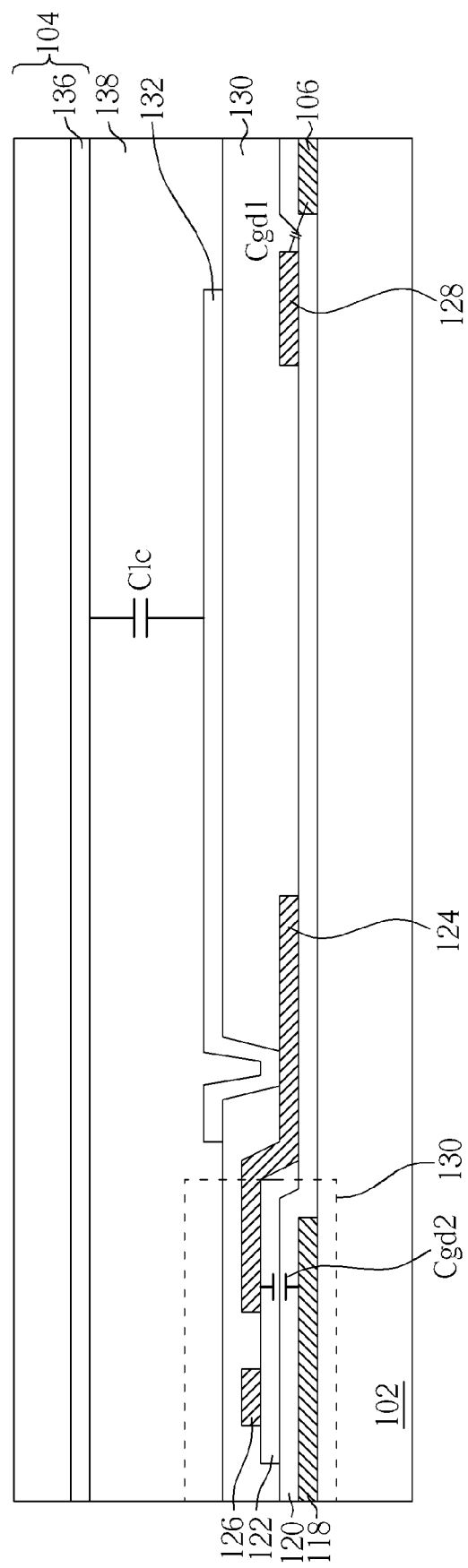
FIG. 5 is a schematic diagram illustrating a cross-sectional view of the LCD panel along with line AA' shown in FIG. 4 according to the first embodiment of the present invention.

In order to clearly describe the pixel structure of the present invention, the following description takes the pixels in a same scan line as an example to describe. Refer to FIG. 4 and FIG. 5 together with FIG. 3. FIG. 4 is a schematic diagram illustrating a top view of the pixel in the same scan line of the LCD panel according to a first embodiment of the present invention. FIG. 5 is a schematic diagram illustrating a cross-sectional view of the LCD panel along with line AA' shown in FIG. 4 according to the first embodiment of the present invention. As shown in FIG. 4 and FIG. 5, each pixel 110 of the LCD panel 100 includes a gate electrode 118, a gate insulating layer 120, a semiconductor layer 122, a drain electrode 124, a source electrode 126, an extending electrode 128, a passivation layer 130 and a pixel electrode 132. The gate electrodes 118 are disposed on the first substrate 102, and electrically connected to the corresponding scan line 106. The gate insulating layer 120 is disposed on the gate electrodes 118 and the first substrate 102, and each semiconductor layer 122 is disposed on the gate insulating layer 120. Each drain electrode 124 and each source electrode 126 are disposed on the corresponding semiconductor layer 122 and the gate insulating layer 120, and the source electrodes 126 are electrically connected to the corresponding data line 108. Each gate electrode 118, the gate insulating layer 120, the corresponding semiconductor layer 122, the corresponding drain electrode 124 and the corresponding source electrode 126 constitute a thin film transistor (TFT) 130. Each pixel electrode 132 is disposed on the first substrate 102, and electrically connected to the corresponding drain electrode 124. In addition, the extending electrodes 128 are disposed on the first substrate 102, and each extending electrode 128 is electrically connected to the corresponding drain electrode 124 in the same pixel 110. It should be noted that each extending electrode 128 is an extending part of the corresponding drain electrode 124, and the extending electrodes 128 and the drain electrodes 124 are made by a same metal layer. The extending electrodes 128 are adjacent to the corresponding scan line 106, so that the extending electrode 128 is coupled to the corresponding scan line 106 so as to generate a first coupling capacitor Cgd1.

In this embodiment, each extending electrode 128 is disposed at the outside of the corresponding TFT 130, and does not overlap the gate electrode 118 and the scan line 106. Each extending electrode 128 is parallel to the corresponding scan line 106, so that each first coupling capacitor Cgd1 is a lateral capacitor. It should be noted that coupled areas between the extending electrodes 128 in the same scan line 106 and the corresponding scan line 106 increase as distances between the extending electrodes 128 and the corresponding signal-input end 112 increase, and capacitances of the first coupling capacitors Cgd1 generated by the extending electrodes 128 and the corresponding scan line 106 coupled to each other increase as distances between the extending electrodes 128 and the corresponding signal-input end 112 increase. The coupled area between each extending electrodes 128 of this embodiment is increased by extending a length of each extending electrode 128 along with the scan line 106, but the present invention is not limited to extend the length of each extending electrode along with the scan line to increase the capacitance of each first coupling capacitor. Furthermore, each pixel electrode 132 overlaps the corresponding common line 117, so that each pixel electrode 132 is coupled to the corresponding common line 117 so as to generate a storage capacitor Cs. In addition, each gate electrode 118 and the corresponding drain electrode 124 have a second overlapping region 134, so that each gate electrode 118 and the corresponding drain electrode 124 are coupled to each other so as to form a second coupling capacitor Cgd2, and the second coupling capacitor Cgs2 is a vertical capacitor.

Figure 6:
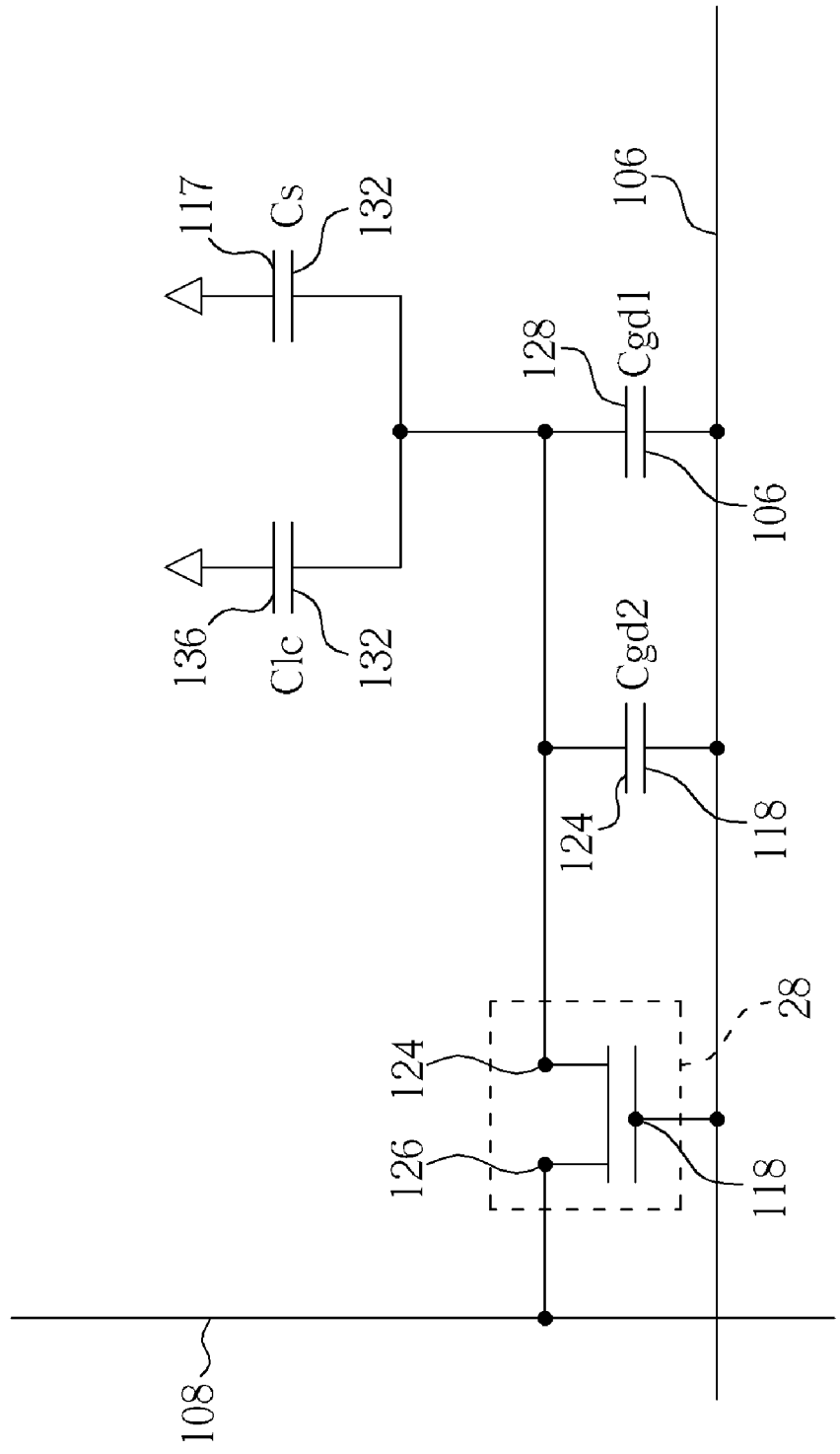
FIG. 6 is a schematic diagram illustrating an equivalent circuit in a same scan line of the LCD panel according to the first embodiment of the present invention.

The following description will further describe that this embodiment utilizes the extending electrode to solve the problem of the displaying frames with insufficient brightness and flicker. Refer to FIG. 6, and refer to FIG. 3, FIG. 4 and FIG. 5 again. FIG. 6 is a schematic diagram illustrating an equivalent circuit in a same scan line of the LCD panel according to the first embodiment of the present invention. As shown in FIG. 4 through FIG. 6, each pixel 110 includes a liquid crystal capacitor Clc, a storage capacitor Cs, a first coupling capacitor Cgd1 and a second coupling capacitor Cgd2. The liquid crystal capacitor Clc is generated by a liquid crystal unit composed of the pixel electrode 132, the common electrode 136 and the liquid crystal layer 138. The storage capacitor Cs of this embodiment is coupled between the pixel electrode 132 and the corresponding common line 117. Furthermore, the first coupling capacitor Cgd1 is coupled between each extending electrode 128 and the corresponding scan line 106, and the second coupling capacitor Cgd2 is coupled between each gate electrode 118 and the corresponding drain electrode 124. Also, the gate electrode 118 is electrically connected to the corresponding scan line 106, and the source electrode 126 is electrically connected to the corresponding data line 108. The drain electrode 124 is electrically connected to the pixel electrode 132 of the liquid crystal capacitor Clc.

In addition, a formula for calculating the feed-through voltage of this embodiment is $\Delta Vp=[(Cgd1+Cgd2)/(Clc+Cs+Cgd1+Cgd2)]\times \Delta Vg$, wherein $\Delta Vp$ is a feed-through voltage of each pixel 110, and $\Delta Vg$ is a voltage drop of each gate electrode 118. In addition, the storage capacitor Cs and the liquid crystal capacitor Clc are substantially ten times of the first coupling capacitor Cgd1 and the second coupling capacitor Cgd2; this means that CsClc>>Cgd1Cgd2. For this reason, the formula can be simplified to be $\Delta Vp=[(Cgd1+Cgd2)/(Clc+Cs)]\times \Delta Vg$. In this embodiment, the overlapping areas of the pixel electrodes 132 of the pixels 110 and the corresponding common line 117 are substantially the same, so that the storage capacitors Cs substantially have a same capacitance. Furthermore, the liquid crystal capacitors Clc of the pixels 110 of this embodiment substantially have the same capacitance, and the second coupling capacitors Cgd2 of the pixels 110 substantially have a same capacitance. In displaying frames, the RC effect generated by combining the scan line 106 should be considered. This means that the voltage drops $\Delta Vg$ of the gate electrodes 118 in the same scan line decrease as the distances between the gate electrodes 118 and the corresponding signal-input end 112 increase. Accordingly, the feed-through voltages $\Delta Vp$ is also dropped. However, it should be noted that this embodiment disposes each extending electrode 128 in each pixel 110 to be coupled to the corresponding scan line 106 so as to generate the first coupling capacitor Cgd1. Therefore, the feed-through voltages $\Delta Vp$ of the pixels 110 can be adjusted to be substantially the same through adjusting the capacitances of the first coupling capacitors Cgd1 according to the formula of the feed-through voltage of this embodiment. This embodiment increases the coupled areas between the extending electrodes 128 and the corresponding scan line 106 as the distances between the extending electrodes 128 and the corresponding signal-input end 112 increase so as to compensate the decreased amount of the voltage drops $\Delta Vg$ of the gate electrode 118 as the distances between the extending electrodes 128 and the corresponding signal-input end 112 increase. The problem of the displaying frames with insufficient brightness and flicker can be therefore solved. Furthermore, the second coupling capacitors Cgd2 of the present invention are not limited to have the same capacitance, and the second coupling capacitor Cgd2 also can be increased as the distances between the extending electrodes 128 and the corresponding signal-input end 112 increase so as to increase the compensation for the voltage drops $\Delta Vg$ of each gate electrodes 118.

Figure 7:
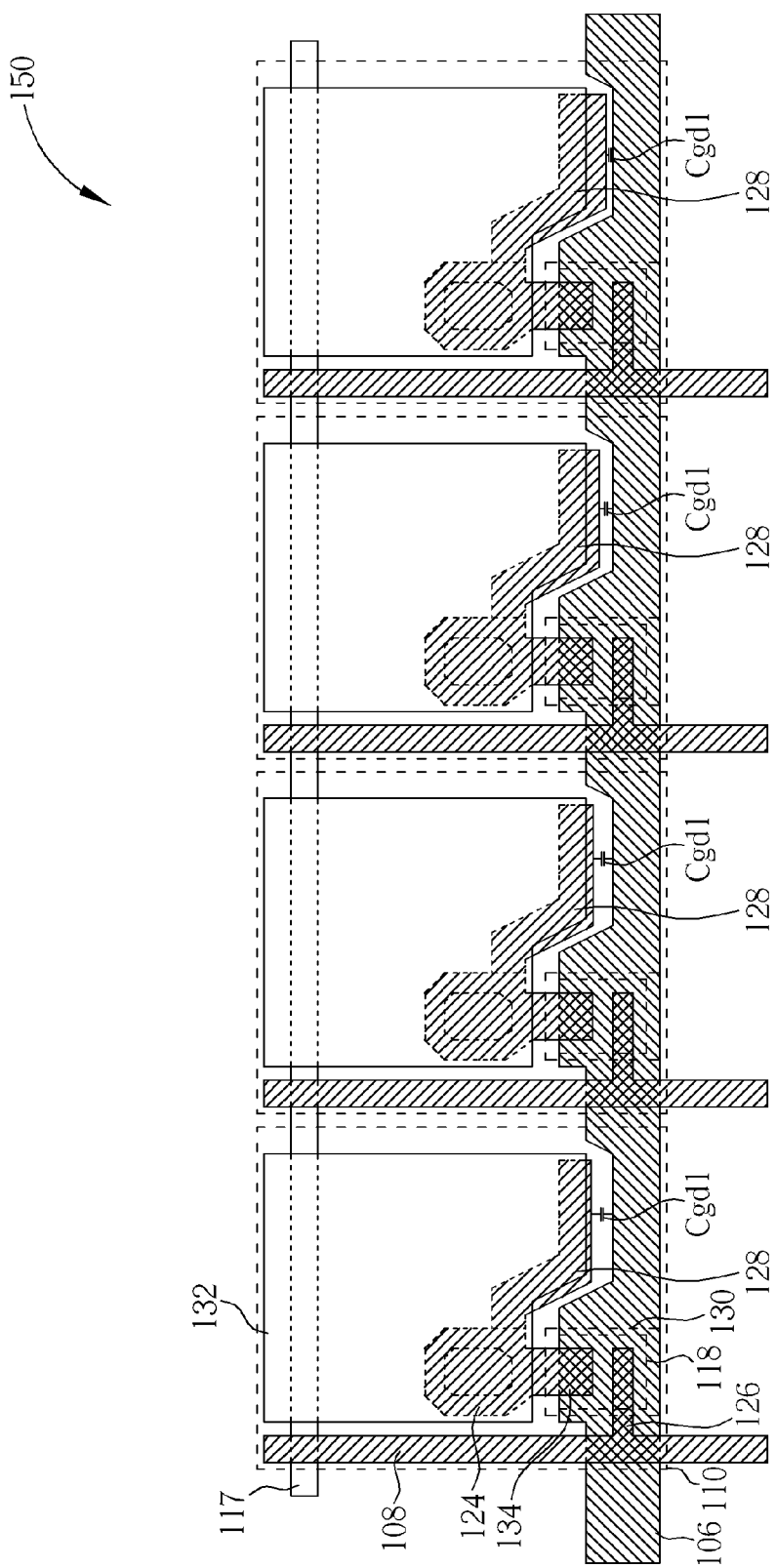
FIG. 7 is a schematic diagram illustrating a top view of the pixel in a same scan line of the LCD panel according to a second embodiment of the present invention.

However, the LCD panel of the present invention is not limited that the coupled areas of the above-mentioned embodiment between the extending electrodes and the corresponding scan line increase as the distances between the extending electrodes and the corresponding signal-input end increase. For easily comparing the difference between the embodiments, the device structures in the following embodiments use the same symbols as the first embodiment, and the same structures are not detailed redundantly. Refer to FIG. 7 together with FIG. 3. FIG. 7 is a schematic diagram illustrating a top view of the pixel in a same scan line of the LCD panel according to a second embodiment of the present invention. As shown in FIG. 7, as compared with the first embodiment, distances between the extending electrodes 128 in the same scan line 106 and the corresponding scan line 106 decrease in the LCD panel 150 of this embodiment as the distances between the extending electrodes 128 and the corresponding signal-input end 112 increase. The coupled areas of the extending electrodes 128 in the same scan line 106 and the corresponding scan line 106 are substantially the same. This means that the lengths of the extending electrodes 128 along with the scan line 106 do not change as the distances between the extending electrodes 128 and the corresponding signal-input end 112 increase. This embodiment adjusts the distances between the extending electrodes 128 and the corresponding scan line 106 so as to increase the capacitances of the first coupling capacitors Cgd1 as the distances between the extending electrodes 128 and the corresponding signal-input end 112 increase. The decreased amount of the voltage drops $\Delta Vg$ of the gate electrode 118 can be therefore compensated.

Figure 8:
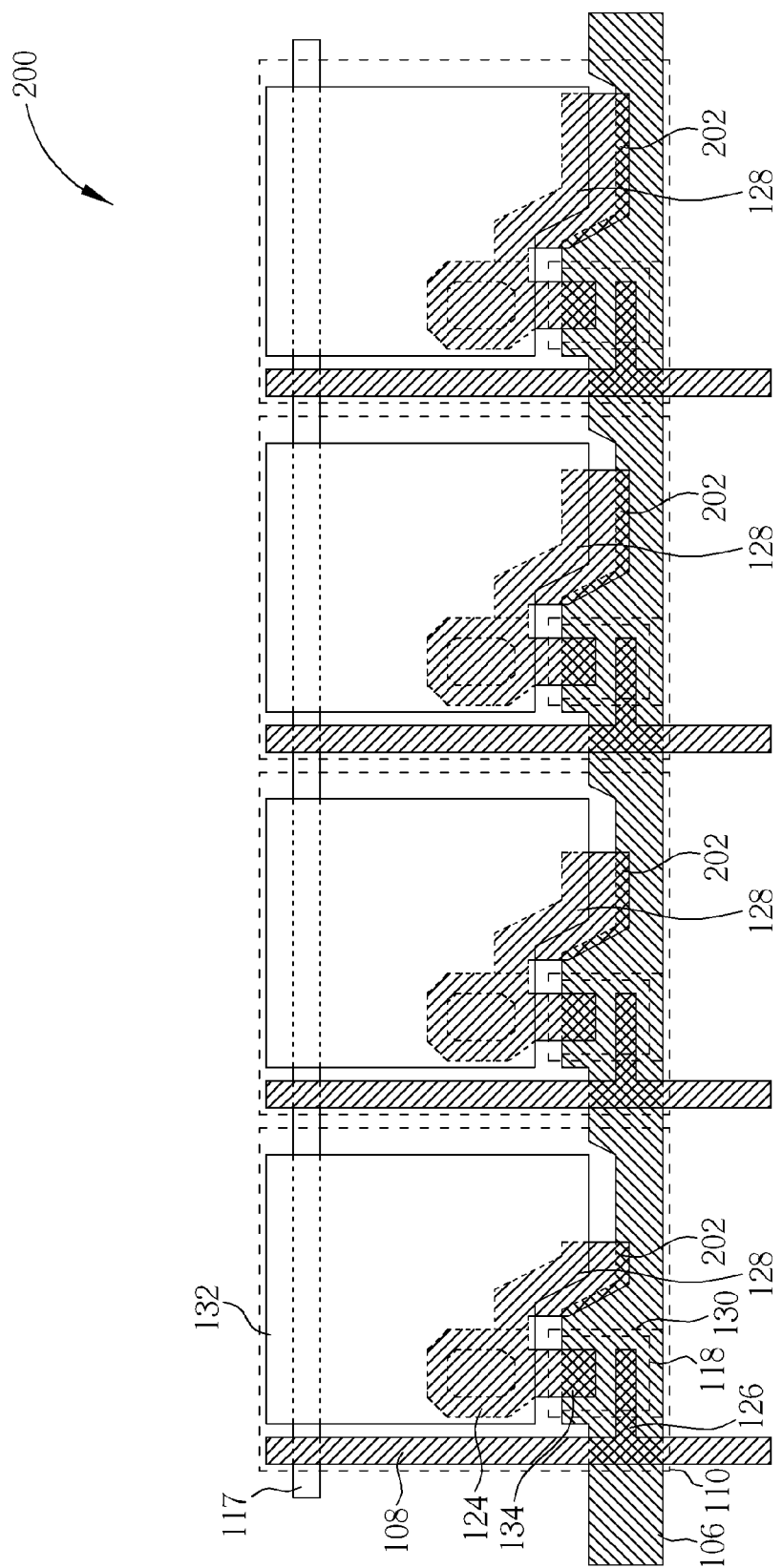
FIG. 8 is a schematic diagram illustrating a top view of the pixel in a same scan line of the LCD panel according to a third embodiment of the present invention.

In addition, the present invention is not limited that the extending electrodes in the same scan line do not overlap the scan line, and the extending electrodes can overlap the corresponding scan line so as to adjust the coupling capacitor between the extending electrodes and the corresponding scan line. Refer to FIG. 8 together with FIG. 3. FIG. 8 is a schematic diagram illustrating a top view of the pixel in a same scan line of the LCD panel according to a third embodiment of the present invention. As shown in FIG. 8, as compared with the first embodiment, each extending electrode 128 and the corresponding scan line 106 in the LCD panel 200 of this embodiment have a first overlapping region 202, so that the first coupling capacitor Cgd1 is a vertical capacitor, and the coupled areas of the first overlapping regions 202 increase as the distances between the extending electrodes 128 and the corresponding signal-input end 112 increase.

Figure 9:
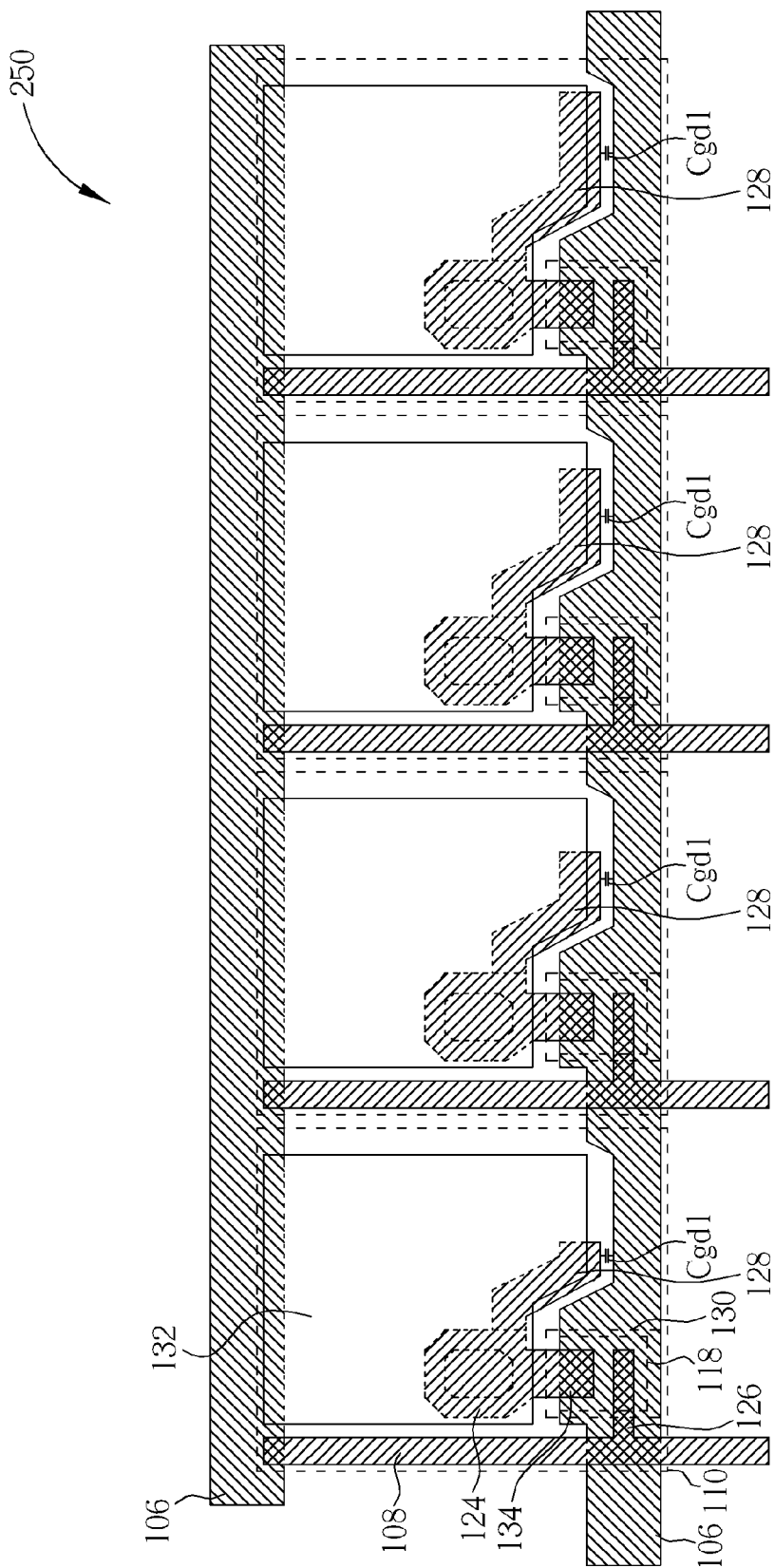
FIG. 9 is a schematic diagram illustrating a top view of the pixel in a same scan line of the LCD panel according to a fourth embodiment of the present invention.

Furthermore, the present invention is not limited to be the type of Cs on common, and the LCD panel of the present invention also can be a type of the storage capacitor on the gate electrode (Cs on gate). Refer to FIG. 9 together with FIG. 3. FIG. 9 is a schematic diagram illustrating a top view of the pixel in a same scan line of the LCD panel according to a fourth embodiment of the present invention. As shown in FIG. 9, as compared with the first embodiment, the storage capacitors Cs of the pixels 110 are coupled between the pixel electrode 132 and the corresponding scan line 106 in the LCD panel 250 of this embodiment. This means that each pixel electrode 132 of each pixel 110 overlaps the corresponding scan line 106.

In summary, the present invention extends each drain electrode of each pixel to form each extending electrode, and utilizes each extending electrode to be coupled to the corresponding scan line so as to generate a coupling capacitor in each pixel. The capacitance of each coupling capacitor of each pixel is adjusted to increase the capacitances of the coupling capacitors as the distances between the extending electrodes and the corresponding signal-input end increase. Therefore, the decreased amount of the voltage drops of the gate electrodes can be compensated as the distances between the extending electrodes and the corresponding signal-input end increase, so that the problem of the displaying frames with insufficient brightness and flicker can be solved.

Those skilled in the art will readily observe that numerous modifications and alterations of the device and method may be made while retaining the teachings of the invention.

What is claimed is:

1. A liquid crystal display panel, comprising:
   a substrate;
   a plurality of scan lines, disposed on the substrate, and each scan line having a signal-input end;
   a plurality of data lines, disposed on the substrate; and
   a plurality of pixels, each pixel being defined by any two of the adjacent scan lines and any two of the data lines, and each pixel comprising:
      a gate electrode, disposed on the substrate, and electrically connected to a corresponding scan line;
      a gate insulating layer, disposed on the gate electrode and the substrate;
      a semiconductor layer, disposed on the gate insulating layer;
      a drain electrode and a source electrode, disposed on the semiconductor layer and the gate insulating layer, and the source electrode being electrically connected to a corresponding data line;
      an extending electrode, disposed on the substrate, the extending electrode being an extending part of the drain electrode, and the extending electrode being electrically connected to the drain electrode and not overlapping with the gate electrode;
      a pixel electrode, disposed on the substrate, and electrically connected to the drain electrode; and
      a first coupling capacitor, coupled between the extending electrode and the corresponding scan line;
   wherein in each scan line, capacitances of the first coupling capacitors between the extending electrodes and the corresponding scan line increase as distances between the extending electrodes and a corresponding signal-input end increase.

2. The liquid crystal display panel of claim 1, wherein the extending electrodes do not overlap the scan lines, each extending electrode is parallel to the corresponding scan line, and each first coupling capacitor is a lateral capacitor.

3. The liquid crystal display panel of claim 2, wherein in each scan line, coupled areas between the extending electrodes and the corresponding scan line increase as distances between the extending electrodes and the corresponding signal-input end increase.

4. The liquid crystal display panel of claim 2, wherein in each scan line, distances between the extending electrodes and the corresponding scan line decrease as distances between the extending electrodes and the corresponding signal-input end increase.

5. The liquid crystal display panel of claim 1, wherein each extending electrode and the corresponding scan line have a first overlapping region, and each first coupling capacitor is a vertical capacitor.

6. The liquid crystal display panel of claim 5, wherein areas of the first overlapping regions increase as distances between the extending electrodes and the corresponding signal-input end increase.

7. The liquid crystal display panel of claim 1, wherein each pixel further comprises a second coupling capacitor, coupled between each gate electrode and a corresponding drain electrode.

8. The liquid crystal display panel of claim 7, wherein the second coupling capacitors substantially have a same capacitance.

9. The liquid crystal display panel of claim 7, wherein each gate electrode and the corresponding drain electrode have a second overlapping region, and each second coupling capacitor is a vertical capacitor.

10. The liquid crystal display panel of claim 1, wherein each pixel further comprises a storage capacitor, coupled between each pixel electrode and the corresponding scan line.

11. The liquid crystal display panel of claim 1, further comprising a plurality of common lines, disposed on the substrate, and each pixel further comprising a storage capacitor, coupled between each pixel electrode and a corresponding common line.

* * * * *